(12) United States Patent
Jia et al.

(10) Patent No.: US 11,399,274 B2
(45) Date of Patent: Jul. 26, 2022

(54) OBTAINING 5G OR NEXT GENERATION NETWORK DUAL CONNECTIVITY MOBILE DEVICE COMMUNICATION-RELATED OPERATING INFORMATION

(71) Applicant: AT&T Intellectual Property I, L.P., Atlanta, GA (US)

(72) Inventors: Yupeng Jia, Austin, TX (US); Inderpreet Ahluwalia, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 122 days.

(21) Appl. No.: 16/374,858

(22) Filed: Apr. 4, 2019

(65) Prior Publication Data
US 2020/0322785 A1 Oct. 8, 2020

(51) Int. Cl.
| | |
|---|---|
| H04W 8/24 | (2009.01) |
| H04W 48/16 | (2009.01) |
| H04W 88/06 | (2009.01) |
| H04W 72/04 | (2009.01) |
| H04W 76/15 | (2018.01) |
| H04W 72/12 | (2009.01) |
| H04B 7/0413 | (2017.01) |

(52) U.S. Cl.
CPC ............ *H04W 8/24* (2013.01); *H04W 48/16* (2013.01); *H04W 72/0406* (2013.01); *H04W 72/1215* (2013.01); *H04W 76/15* (2018.02); *H04W 88/06* (2013.01); *H04B 7/0413* (2013.01)

(58) Field of Classification Search
CPC ....... H04W 88/06; H04W 88/02; H04W 4/50; H04W 28/0268; H04W 4/70; H04W 8/24; H04W 48/16; H04W 72/0406; H04W 72/1215; H04W 76/15; H04B 7/0413
See application file for complete search history.

(56) References Cited

U.S. PATENT DOCUMENTS

| | | | |
|---|---|---|---|
| 2012/0082095 A1* | 4/2012 | Sun | H04W 72/0406 370/328 |
| 2018/0160461 A1* | 6/2018 | Addepalli | H04W 88/06 |
| 2018/0199395 A1* | 7/2018 | Huang-Fu | H04L 67/14 |
| 2018/0220373 A1* | 8/2018 | Arzelier | H04W 52/0241 |
| 2019/0313271 A1* | 10/2019 | Yiu | H04W 24/10 |
| 2019/0313276 A1* | 10/2019 | Huang-Fu | H04W 28/0273 |

(Continued)

*Primary Examiner* — Khaled M Kassim
*Assistant Examiner* — Najeeb Ansari
(74) *Attorney, Agent, or Firm* — Amin, Turocy & Watson, LLP

(57) ABSTRACT

The described technology is generally directed towards obtaining communication-related operating information of a user equipment, such as via a terminal adapter to a terminal equipment. Communication-related operating information can include component carrier information, frequency band information, MIMO layer information, modulation information, and active user plane (uplink and downlink) information. In one aspect, a terminal equipment can send a communication command (e.g., an AT command) to a terminal adapter requesting return of frequency-related operating information and/or active user plane information, and receive the requested information from the terminal adapter. The terminal equipment provides access to the received information to a program running on the terminal equipment.

20 Claims, 10 Drawing Sheets

(56) References Cited

U.S. PATENT DOCUMENTS

| | | | | |
|---|---|---|---|---|
| 2019/0313277 | A1* | 10/2019 | Huang-Fu | H04W 28/0273 |
| 2019/0373649 | A1* | 12/2019 | Magadevan | G06F 9/00 |
| 2020/0045762 | A1* | 2/2020 | Raghuram | H04W 76/30 |
| 2020/0187015 | A1* | 6/2020 | Li | H04W 16/26 |
| 2020/0196249 | A1* | 6/2020 | Du | H04W 52/288 |
| 2021/0235257 | A1* | 7/2021 | Jiang | H04W 8/20 |

\* cited by examiner

OBTAINING 5G OR NEXT GENERATION NETWORK DUAL CONNECTIVITY MOBILE DEVICE COMMUNICATION-RELATED OPERATING INFORMATION

TECHNICAL FIELD

The subject application is related to wireless communication systems, and, for example, to obtaining dual connectivity, communication-related operating information from a mobile device, and related embodiments.

BACKGROUND

In new radio (NR, alternatively referred to as 5G) deployment, dual connectivity (via a non-standalone architecture) employs both long term evolution (LTE) connectivity and 5G connectivity. This allows operators to leverage LTE network coverage and throughput to provide a better user experience, e.g., by using LTE for the control plane communications and 5G for the user plane communications. Thus, with LTE-NR dual connectivity, a 5G mobile device/user equipment can simultaneously connect to 5G/NR and LTE eNB, and data traffic can be sent over both the LTE link and the NR link.

In wireless communication systems, particularly in new radio (NR, sometimes referred to as 5G), lab testing and field testing need to be performed on mobile devices. When performing such tests, there is no standardized way to check the status of significant LTE and NR communication-related operating information, such as whether LTE or NR, or both, are in use, as well as information such as operating frequency band information, component carrier information, user plane information, and so on. Instead, lab and field testing of such mobile device has to rely on proprietary vendor-specific commands and/or tools to obtain such information, which for example, needs to read logged data.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
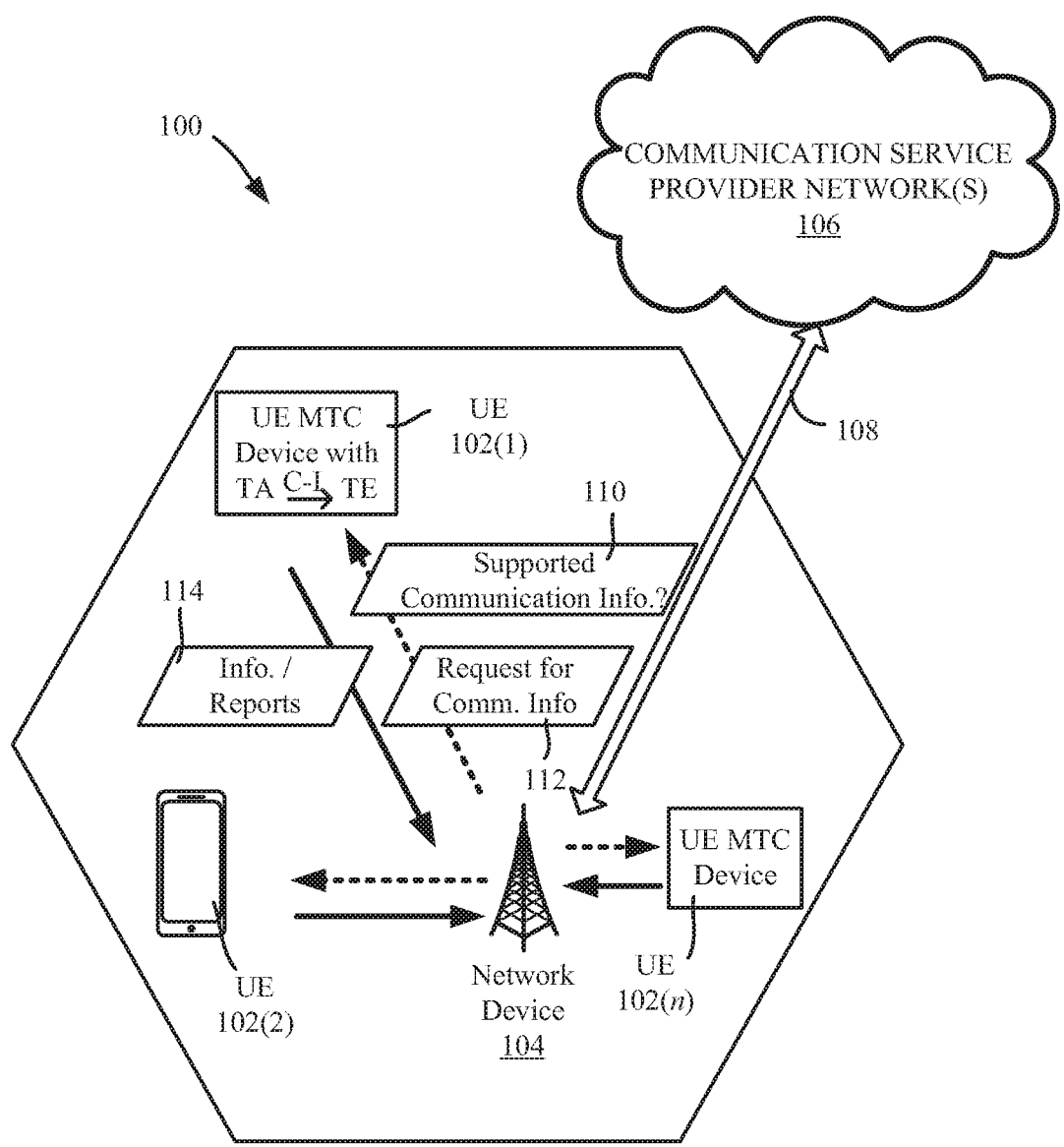
FIG. 1 illustrates an example wireless communication system in which a communication-related operating information is transferred between a terminal adapter (TA) and a terminal equipment (TE) of a user equipment and a network device, in accordance with various aspects and implementations of the subject disclosure.

Briefly, one or more aspects of the technology described herein are generally directed towards notifying users or testers communication-related operating information of dual connectivity mobile devices. In one or more implementations, this is accomplished via extensions to the AT (ATtention) command set for transferring communication-related operating information from a mobile device terminal adapter (TA, alternatively spelled terminal "adaptor") to a terminal equipment (TE). Note that as used herein, dual connectivity/non-standalone mode can be referred to as "EN-DC" mode, where EN-DC refers to E-UTRA-NR (Evolved-Universal Terrestrial Radio Access-New Radio) Dual Connectivity.

As will be understood, such communication-related operating information can indicate for a mobile device that supports dual connectivity whether long term evolution (LTE) communications are in use, whether new radio communications are in use, or whether both LTE and new radio communications are in use. For LTE, this can include the total LTE component carriers operating in the EN-DC mode, the LTE frequency bands operating in the EN-DC mode, MIMO (multiple input multiple output) layers per LTE band and modulations per LTE band. For new radio, this can include the total new radio component carriers operating in the EN-DC mode, the new radio frequency bands operating in the dual EN-DC mode, MIMO layers per new radio band and modulations per new radio band. Still further, information can include information on the active user plane links being used for downlink and uplink in the EN-DC mode, including for LTE only, new radio only or LTE plus new radio.

Moreover, the technology described herein can include support for other aspects of communication-related operating information, such as LTE carrier aggregation and licensed assisted access (LAA). This can include LAA total LTE component carriers, LAA LTE frequency bands, LAA MIMO layers per LTE band, LAA modulations per LTE band, LAA total LAA unlicensed carriers, LAA unlicensed frequency bands, LAA MIMO Layers per unlicensed band, and LAA modulations per unlicensed band.

In general and as used herein, a terminal adapter comprises an interface to a wireless network, and can include chipsets, modems, modules, and/or other emerging devices that, for example, support LTE, CAT-M1, NB-IoT, 5G massive IoT and the like. As also used herein, a terminal equipment comprises any machine (e.g., computer, device, application processor and the like) that couples to a terminal adapter to access wireless/cellular services. In general, a terminal adapter and a terminal equipment are incorporated into a mobile equipment device (e.g., that operates as a user equipment device once associated with a subscriber identity).

The terminal equipment can execute a program that directly, or indirectly (e.g., by being communicatively coupled to another network device), allows a tester to view the communication-related operating information. At present, a terminal equipment has no visibility to the such communication-related operating information in use by a mobile device network device. Described herein is a technology for providing the terminal equipment with the communication-related operating information, whereby the terminal equipment (e.g., one or more programs running thereon) can then use the coverage enhancement information to make intelligent decisions. For example, a program running on the terminal equipment can forward the communication-related operating information to a user interface to help troubleshoot device and network issues. As another example, a program running on the terminal equipment can forward the communication-related operating information to one or more backend systems to improve device/network management design.

In one or more implementations, transferring communication-related operating information from the terminal adapter to the terminal equipment can be accomplished through text string extensions, e.g., to the AT (ATtention) command interface, originally used to control modems, but at present still widely supported, including by GSM/GPRS modems and mobile phones. In alternative implementations, more dedicated/proprietary programming interfaces (e.g., application programming interfaces) and the like can be used to transfer communication-related operating information from the terminal adapter to the terminal equipment.

It should be understood that any of the examples and terms used herein are non-limiting. For instance, examples can be based on New Radio (NR, sometimes referred to as 5G) communications between a user equipment exemplified as a mobile device or the like and network device; however virtually any communication system may benefit from the technology described herein, and/or their use in different spectrums may likewise benefit. Indeed, the term mobile device as used herein is synonymous with "user equipment" (even if once deployed the user equipment, such as a sensor, is primarily stationary). As another example, the technology is not limited to any particular type of communication devices, but rather any wireless-capable user equipment may benefit from the technology described herein, including, wearables, smartphones, tablets, notebooks, modems (cards, dongles/adapters (e.g., USB)) and so on. Indeed, any communication system capable of using communication-related operating information may benefit from the technology described herein. Still further, examples are described with respect to extending the AT command interface with text commands to support communication-related operating information reporting; however any technology that allows for communication of coverage communication-related operating information between a terminal adapter and a terminal equipment may be implemented. Moreover, while the technology described herein provides benefits in lab testing, field testing and so forth, other uses, including dynamic adaptation of an actual, in-use consumer mobile device based on the information can be used with the technology described herein Thus, any of the examples herein are non-limiting examples, and any of the embodiments, aspects, concepts, structures, functionalities or examples described herein are non-limiting, and the technology may be used in various ways that provide benefits and advantages in wireless radio communications in general.

FIG. 1 illustrates an example wireless communication system 100 in accordance with various aspects and embodiments of the subject technology. In one or more embodiments, the system 100 can comprise one or more user equipment, e.g., UEs 102(1)-102(n). The user equipments 102(1)-102(n) exemplified in FIG. 1 (and FIG. 2) can be any combination of category(ies) of machine type communication (MTC) device(s), cell phones, wearables, and so on.

In various embodiments, the system 100 is or comprises a wireless communication network serviced by one or more wireless communication network providers. In example embodiments, user equipments (UEs, collectively 102) can be communicatively coupled to the wireless communication network via a network device 104 (e.g., network node). The network device 104 can communicate the UEs 102, thus providing connectivity between the UEs 102 and the wider cellular network.

In example implementations, each UE such as the UE 102(1) is able to send and/or receive communication data via a wireless link to the network device 104. The dashed arrow lines from the network device 104 to the UEs 102 represent downlink (DL) communications and the solid arrow lines from the UEs 102 to the network devices 104 represents uplink (UL) communications.

The system 100 can further include one or more communication service provider networks 106 that facilitate providing wireless communication services to various UEs, including UES 102(1)-102(n), via the network device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., the UEs 102 and the network device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

In FIG. 1, as described herein, a user equipment (e.g., 102(1)) is configured to receive communications from the network device 104, such as communications 110 requesting whether the communication-related operating information described herein is supported, and if so, communications 112 requesting the communication-related operating information (e.g., in a reports) 114. As will be understood, the user equipment device 102(1) is configured with the technology described herein that transfers communication-related operating information (C-I) from the terminal adapter (TA) of the user equipment 102(1) to the terminal equipment (TE) of the user equipment 102(1). Note that in the example of FIG. 1, the network device 104 can include a server with analysis code or the like for testing the user equipment device 102(1). The network device can also be simulated or the like in a laboratory environment, and indeed can be a device such as a mobile computer that couples to the terminal equipment by physical wired connection or wirelessly, such as to use the communication-related operating information for device testing, analysis, and so on.

Figure 2:
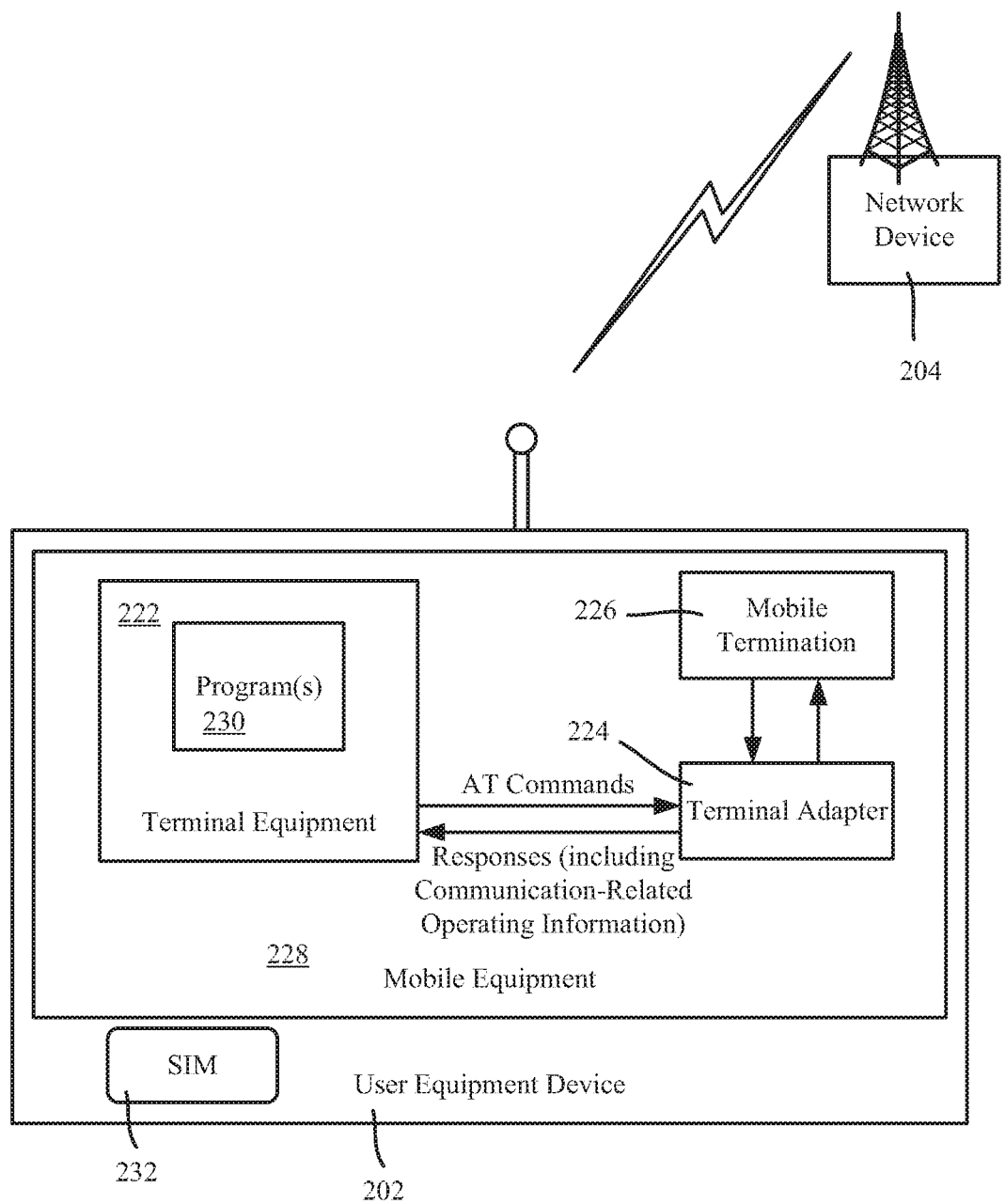
FIG. 2 illustrates an example user equipment device in which a terminal adapter transfers communication-related operating information to a terminal equipment, in accordance with various aspects and implementations of the subject disclosure.

FIG. 2 represents an example user equipment device 202 wirelessly coupled to a network device 204. In the example of FIG. 2, the user equipment 202 comprises a terminal equipment 222 communicatively coupled to a terminal adapter 224, which in turn is communicatively coupled to a mobile termination component 226. As is generally understood, the terminal equipment 222, terminal adapter 224, and mobile termination component 226 (the components for standard mobile terminal functions) can be considered a mobile equipment 228; the terminal adapter 224 serves as the interface between the terminal equipment 222 and the mobile termination component 226. The terminal equipment 222 runs one or more programs 230, comprising software, firmware and/or hardcoded instructions executed on a processor of the terminal equipment 222.

Thus, as is conventionally understood, a mobile equipment 228 includes the terminal equipment 222, the terminal adapter 224 and the mobile termination 226. When coupled to a subscriber identity module 232 (SIM, such as via a SIM card or a SIM embedded into a smaller device such as a sensor), the mobile equipment 228 can be considered functional user equipment, that is, an operational user equipment device 202. Note that any or all of the components of FIG. 2 may be separate as depicted in the example of FIG. 2, or alternatively combined at least in part, integrated into one or more larger component(s), partially integrated, and so on. For example in a test scenario, AT commands can be sent from a terminal equipment that is separate (e.g., not integrated into) the mobile equipment.

As represented in the example of FIG. 2, the terminal equipment 222 can communicate with the terminal adapter 224, such as via (but not limited to) AT commands sent using the AT command interface/protocol. As described herein, the terminal adapter 224 responds to such commands, including to transfer communication-related operating information to the terminal equipment 222. This facilitates access to the current operating information to the one or more programs 230 that are running (or can be run) on the terminal equipment 222.

It should be understood that FIG. 2 is only one example of a wireless device capable of implementing the technology described herein. Indeed, the technology described herein can, for example, comprise as a terminal device a computer system, server, facsimile machine, tablet, laptop, handheld device and so on, any of which can be communicatively coupled to an internal terminal adapter, but alternatively can be communicatively coupled to an external terminal adapter (rather than have both be part of an integrated device). Moreover, the terminal adapter can be coupled to a network in any way, including by wired or wireless link(s).

Figure 3:
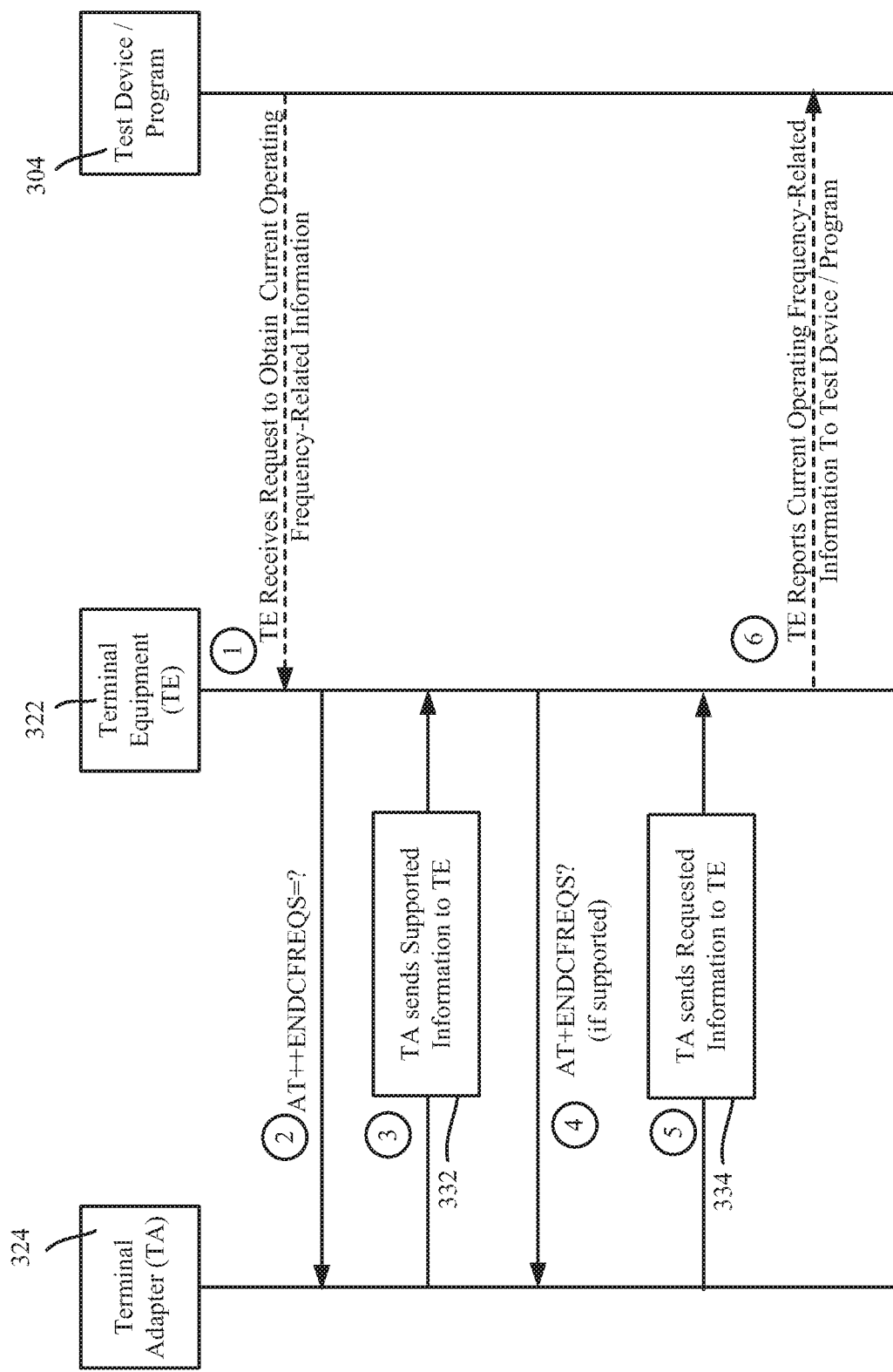
FIG. 3 is an example timing/dataflow diagram illustrating how a terminal equipment, terminal adapter and test device communicate such that the terminal equipment obtains current frequency-related operating information, in accordance with various aspects and implementations of the subject disclosure.

FIG. 3 is an example timing/dataflow diagram showing how a terminal equipment 322 and a terminal adapter 324, along with a test device 304 (e.g., an eNB), operate to obtain communication-related operating information, and more particularly current operating frequency related information, from the terminal adapter 324. As set forth above with reference to FIG. 2, this provides program(s) on the terminal equipment 322 with access to the operating frequency related information.

One or more aspects of the technology described herein comprises a suitable AT command and reply/response communication exchange, generally defined in one implementation as "+ENDCFREQS." In this implementation, the Test command (AT+ENDCFREQS=?) is used to determine whether the mobile device supports this command set. If so, the desired frequency-related information is obtained via a subsequent Read command (AT+ENDCFREQS?). The following table shows the +ENDCFREQS parameter command syntax for the "+ENDCFREQS" command set.

| Command | Possible response(s) |
|---|---|
| +ENDCFREQS? | +ENDCFREQS:[ <Requested_ENDC-Total-LTE-Component-Carriers>], <Requested_ENDC-LTE-Frequency-Bands>], <Requested_ENDC-MIMO-Layers-Per-LTE-Band>], <Requested_ENDC-Modulations-Per-LTE-Band>], <Requested_ENDC-Total-NR-Component-Carriers>], [<Requested_ENDC-NR-Frequency-Bands>], <Requested_ENDC-MIMO-Layers-Per-NR-Band>], <Requested_ENDC-Modulations-Per-NR-Band>], |
| +ENDCFREQS=? | +ENDCFREQS: (list of supported <Requested_ENDC-Total-LTE-Component-Carriers>], <Requested_ENDC-LTE-Frequency-Bands>], <Requested_ENDC-MIMO-Layers-Per-LTE-Band>], <Requested_ENDC-Modulations-Per-LTE-Band>], <Requested_ENDC-Total-NR-Component-Carriers>], [<Requested_ENDC-NR-Frequency-Bands>,, <Requested_ENDC-MIMO-Layers-Per-NR-Band>], <Requested_ENDC-Modulations-Per-NR-Band>]) |

The above command set returns the current parameter values of the mobile device's frequency-related information, e.g., EN-DC LTE/new radio component carrier numbers, frequency bands, MIMO layers per band and modulations per band. In one or more implementation, defined values comprise:

<Requested_ENDC-Total-LTE-Component-Carriers>:
  integer type;

<Requested_ENDC-LTE-Frequency-Bands>: integer type; the LTE operating bands are listed in the table below (from Table 5.5-1 in 3GPP specification TS36.101)

<Requested_ENDC-MIMO-Layers-Per-LTE-Band>]:
  integer type; Example: 1, 2, 4, 8, etc.

<Requested_ENDC-Modulations-Per-LTE-Band>]:
  enum type; Example: BPSK, QPSK, QAM, 16QAM, 32 QAM, 64 QAM, 128QAM, 256 QAM, 512 QAM, 1024QAM, etc.

| | From Table 5.5-1 in 3GPP specification TS36.101; E-UTRA operating bands | | |
|---|---|---|---|
| E UTRA Operating Band | Uplink (UL) operating band BS receive UE transmit FUL_low-FUL_high | Downlink (DL) operating band BS transmit UE receive FDL_low-FDL_high | Duplex Mode |
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD |
| 50 | 1432 MHz-1517 MHz | 1432 MHz-1517 MHz | TDD |
| 51 | 1427 MHz-1432 MHz | 1427 MHz-1432 MHz | TDD |
| 52 | 3300 MHz-3400 MHz | 3300 MHz-3400 MHz | TDD |
| ... | | | |
| 64 | | Reserved | |
| 65 | 1920 MHz-2010 MHz | 2110 MHz-2200 MHz | FDD |
| 66 | 1710 MHz-1780 MHz | 2110 MHz-2200 MHz | FDD |
| 67 | N/A | 738 MHz-758 MHz | FDD |
| 68 | 698 MHz-728 MHz | 753 MHz-783 MHz | FDD |
| 69 | N/A 2570 MHz — 2620 MHz | | FDD[2] |
| 70 | 1695 MHz-1710 MHz | 1995 MHz-2020 MHz | FDD |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD |
| 76 | N/A | 1427 MHz-1432 MHz | FDD |
| 85 | 698 MHz-716 MHz | 728 MHz-746 MHz | FDD |

In one or more implementation, additional defined values (for new radio) comprise:
  <Requested_ENDC-Total-NR-Component-Carriers>: integer type;
  <Requested_ENDC-NR-Frequency-Bands>: integer type; NR is designed to operate in FR1 operating bands defined in 3GPP specification TS 38.101-1 and FR2 operating bands defined in 3GPP specification TS 38.101-2, below.)
  <Requested_ENDC-MIMO-Layers-Per-NR-Band>]: integer type; Example: 1, 2, 4, 8, etc.
  <Requested_ENDC-Modulations-Per-NR-Band>]: enum type; Example: BPSK, QPSK, QAM, 16QAM, 32 QAM, 64 QAM, 128QAM, 256 QAM, 512 QAM, 1024QAM, etc.

(1) in FIG. 3, the test device/program 304 requests the terminal equipment 322 to obtain and return this information.

As represented via the arrow labeled two (2) in FIG. 3, the terminal equipment 322 sends the AT+ENDCFREQS=? Test command to the terminal adapter 324. Note that this need not be done more than once, if indeed at all, if (or once) the terminal equipment 322 knows what is already supported by the terminal adapter 324. As represented via the arrow labeled three (3) in FIG. 3, the terminal adapter 324 responds with the requested information (block 332). Note that not every possible value listed for this command need be supported by a given mobile terminal.

Assuming that in this example the mobile device/terminal adapter 324 supports returning the information that the test device 304 desires, the terminal equipment 322 sends the

| From 3GPP specification TS38.101-1: NR operating bands in FR1 | | | |
|---|---|---|---|
| NR operating band | Uplink (UL) operating band BS receive/UE transmit $F_{UL\_low}$-$F_{UL\_high}$ | Downlink (DL) operating band BS transmit/UE receive $F_{DL\_low}$-$F_{DL\_high}$ | Duplex Mode |
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MH-748 MHz | N/A | SUL |
| n84 | 1920 MHz-1980 MHz | N/A | SUL |
| n86 | 1710 MHz-1780 MHz | N/A | SUL |

| From 3GPP specification TS38.101-2: NR operating bands in FR2 | | | |
|---|---|---|---|
| Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |

By way of example, consider that a test device/program 304 (FIG. 3) wants to know (at least some of) the current operating frequency-related information from a mobile device under test. As represented via the arrow labeled one Read command AT+ENDCFREQS? to obtain the information, as represented by the arrow labeled four (4) in FIG. 3.

The terminal adapter 324 responds with the values that it supports, as represented in FIG. 3 via the arrow labeled five (5) and block 334. For example, consider that for total component carriers, the terminal adapter 324 returns a total of 4 LTE carriers working concurrently with 2 new radio carriers. In this example, the terminal adapter 324 also returns B2, B12, B66, B30 for the LTE bands, and n260 and n260 for the new radio bands (assuming intra band). The terminal equipment 322 receives the information and returns the information, e.g., in a report or the like, to the test device program 304.

In another aspect, active user plane links information can be obtained, generally defined in one implementation as "+ENDCUPLINKS", for both uplink and downlink. In this implementation, the Test command (AT+END-CUPLINKS=?) is used to determine whether the mobile device supports this command set. If so, the desired user plane-related information is obtained via a subsequent Read command (AT+ENDCUPLINKS?).

The following table shows the +ENDCUPLINKS parameter command syntax for the "+ENDCUPLINKS" command set.

| Command | Possible response(s) |
| --- | --- |
| +ENDCUPLINKS? | +ENDCUPLINKS:[ <Requested_ENDC-DL-UserPlane-ACTIVELINKs>], <Requested_ENDC-UL-UserPlane-ACTIVELINKs >] |
| +ENDCUPLINKS=? | +ENDCUPLINKS: (list of supported <Requested_ENDC-DL-UserPlane-ACTIVELINKs >s), (list of supported Requested_ENDC-UL-UserPlane-ACTIVELINKs >s) |

Figure 4:
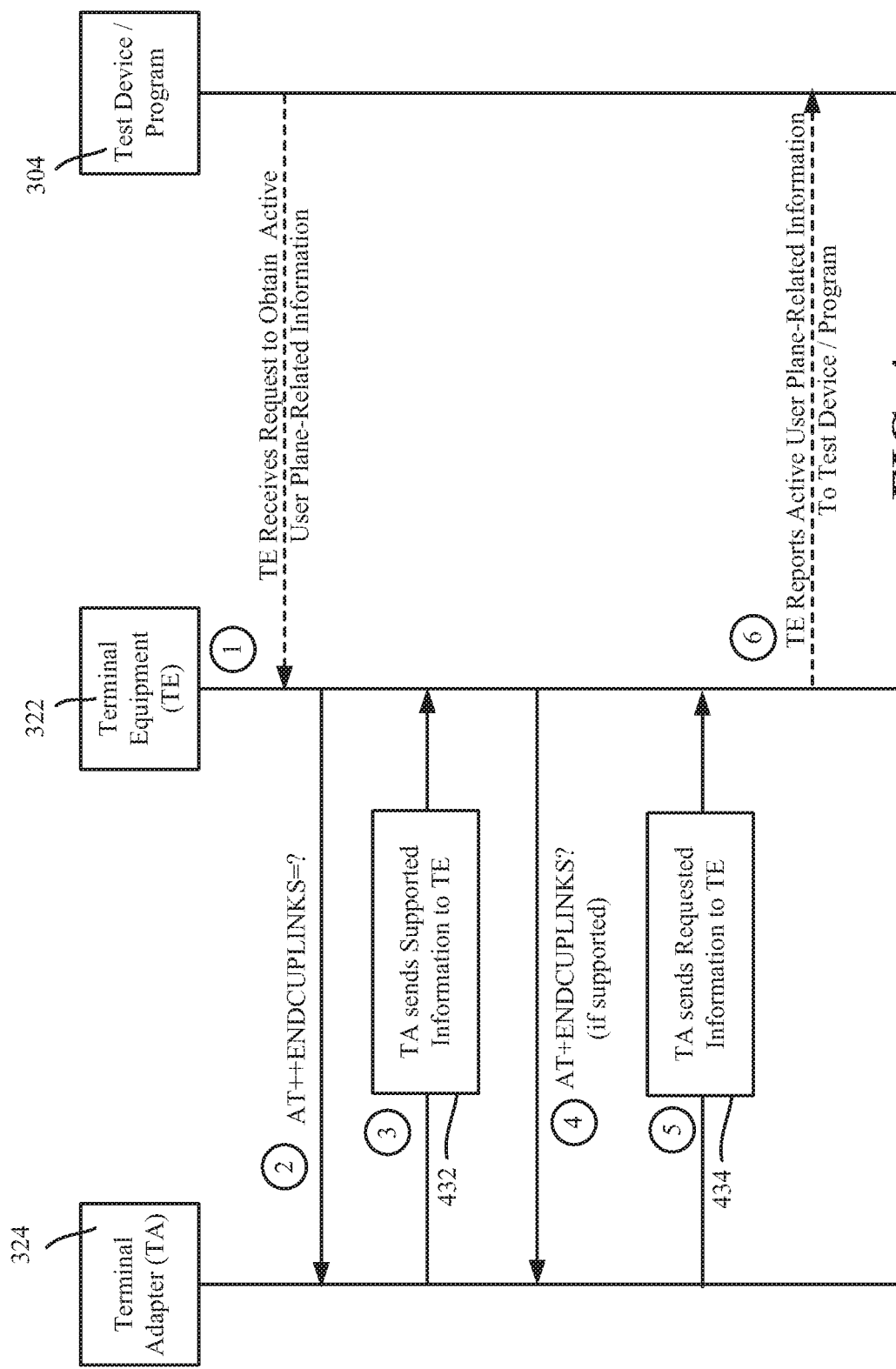
FIG. 4 is an example timing/dataflow diagram illustrating how a terminal equipment, terminal adapter and test device communicate such that the terminal equipment obtains active user plane operating information, in accordance with various aspects and implementations of the subject disclosure.

The ENDCUPLINKS command set returns values for the active user plane links, for downlink and uplink, while the mobile device is operating in EN-DC. In one implementation, the defined values are as follows:
 <Requested_ENDC-DL-UserPlane-ACTIVELINKs>:
  enum type; the returned answer shall be LTE only, NR only, LTE and NR.
 <Requested_ENDC-UL-UserPlane-ACTIVELINKs>:
  enum type; the returned answer shall be LTE only, NR only, LTE and NR In this way, user plane information can be requested and returned as the communication-related operating information, as represented in FIG. 4. For purposes of brevity, the flow of requests and responses, which are similar to those of FIG. 3, are not individually explained with reference to FIG. 4, except to note that the requests are for user plane information, and the responses (blocks 432 and 434) provide the user plane information.

In another aspect, when operating in a licensed assisted access (LAA) mode of operation, an LTE device can use unlicensed spectrum to improve the user experience. Testers and other users can benefit from having easy access to current operating frequency information in this mode. In one implementation, described herein is a suitable AT command and reply/response communication exchange, generally defined in one implementation as "+LAAFREQS." In this implementation, the Test command (AT+LAAFREQS=?) is used to determine whether the mobile device supports this command set. If so, the desired frequency-related information is obtained via a subsequent Read command (AT+LAAFREQS?). The following table shows the +LAAFREQS parameter command syntax for the "+LAAFREQS" command set.

| Command | Possible response(s) |
| --- | --- |
| +LAAFREQS? | +LAAFREQS:[ <Requested_LAA-Total-LTE-Component-Carriers>], <Requested_LAA-LTE-Frequency-Bands>], <Requested_LAA-MIMO-Layers-Per-LTE-Band>], <Requested_LAA-Modulations-Per-LTE-Band>], <Requested_LAA-Total-LAA-unlicensed-Carriers>], [<Requested_LAA-unlicensed-Frequency-Bands>], <Requested_LAA-MIMO-Layers-Per-Unlicensed-Band>], <Requested_LAA-Modulations-Per-unlicensed-Band>], |
| +LAAFREQS=? | +LAAFREQS: (list of supported <Requested_LAA-Total-LTE-Component-Carriers>], <Requested_LAA-LTE-Frequency-Bands>],, <Requested_LAA-MIMO-Layers-Per-LTE-Band>], <Requested_LAA-Modulations-Per-LTE-Band>], <<Requested_LAA-Total-LAA-unlicensed-Carriers>], [<Requested_LAA-unlicensed-Frequency-Bands>,, <Requested_LAA-MIMO-Layers-Per-unlicensed-Band>], <Requested_LAA-Modulations-Per-unlicensed-Band>], <] |

The above command set returns the current parameter values of the mobile device's frequency-related information, e.g., EN-DC LTE/new radio component carrier numbers, frequency bands, MIMO layers per band and modulations per band. In one or more implementation, defined values comprise:

<Requested_LAA-Total-LTE-Component-Carriers>: integer type;
<Requested_LAA-LTE-Frequency-Bands>: integer type; the LTE operating bands are listed in the LTE table above (from Table 5.5-1 in 3GPP specification TS36.101).
<Requested_LAA-MIMO-Layers-Per-LTE-Band>]: integer type; Example: 1, 2, 4, 8, etc.
<Requested_LAA-Modulations-Per-LTE-Band>]: enum type; Example: BPSK, QPSK, QAM, 16QAM, 32 QAM, 64 QAM, 128QAM, 256 QAM, 512 QAM, 1024QAM, etc.
<Requested_LAA-Total-LAA-unlicensed-Carriers>: integer type;
<Requested_LAA-unlicensed-Frequency-Bands>: integer type;
<Requested_LAA-MIMO-Layers-Per-unlicensed-Band>]: integer type;
<Requested_LAA-Modulations-Per-unlicensed-Band>]: enum type.

Figure 5:
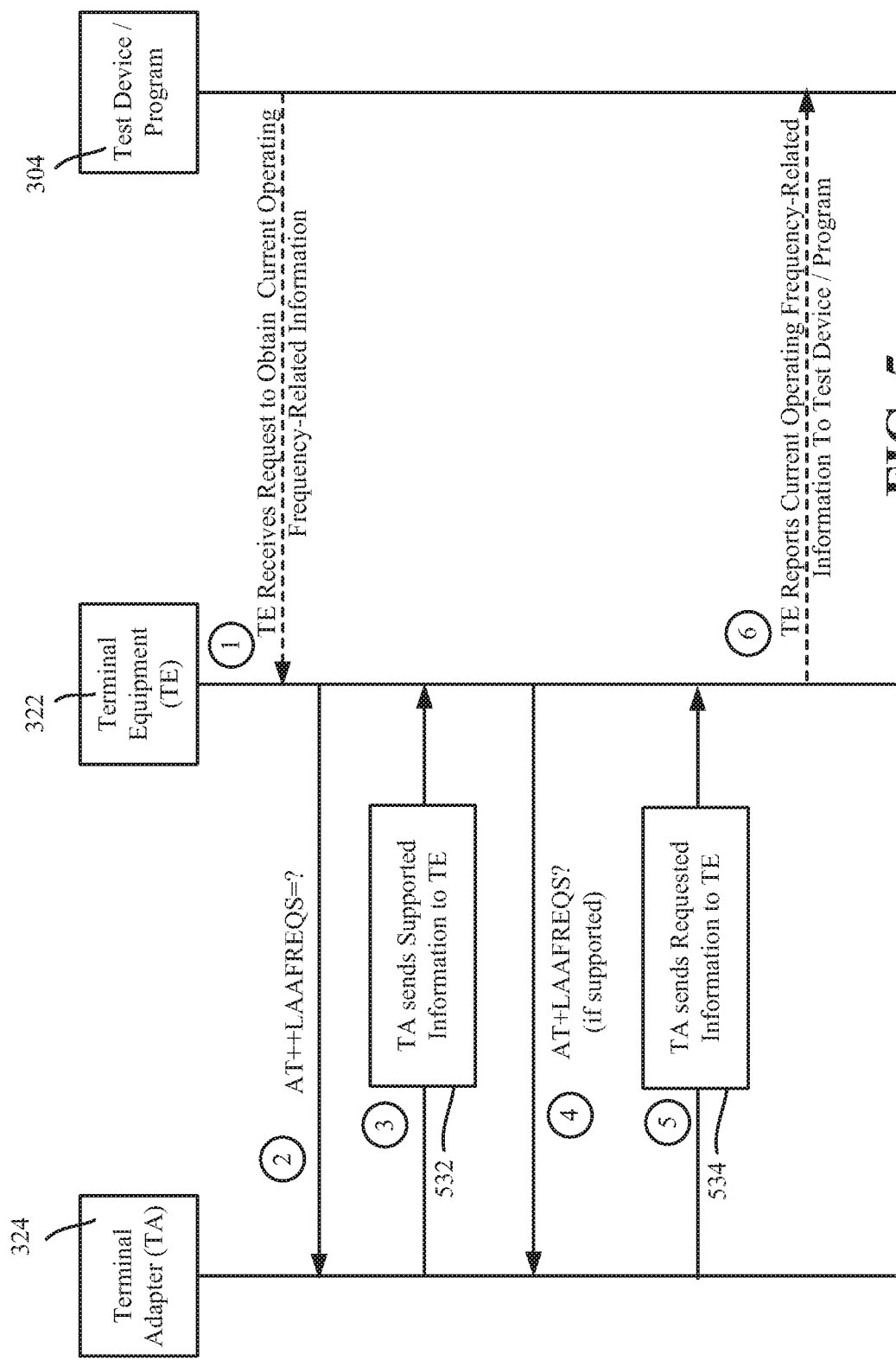
FIG. 5 is an example timing/dataflow diagram illustrating how a terminal equipment, terminal adapter and test device communicate such that the terminal equipment obtains current frequency-related operating information, including licensed assisted access information, in accordance with various aspects and implementations of the subject disclosure.

In this way, LAA information can be requested and returned as the communication-related operating information, as represented in FIG. 5. For purposes of brevity, the flow of requests and responses, which are similar to those of FIG. 3, are not individually explained with reference to FIG. 5, except to note that the requests are for user plane information, and the responses (blocks 532 and 534) represent the above LAA operating frequency-related information that is obtained from the terminal adapter 324.

Figure 6:
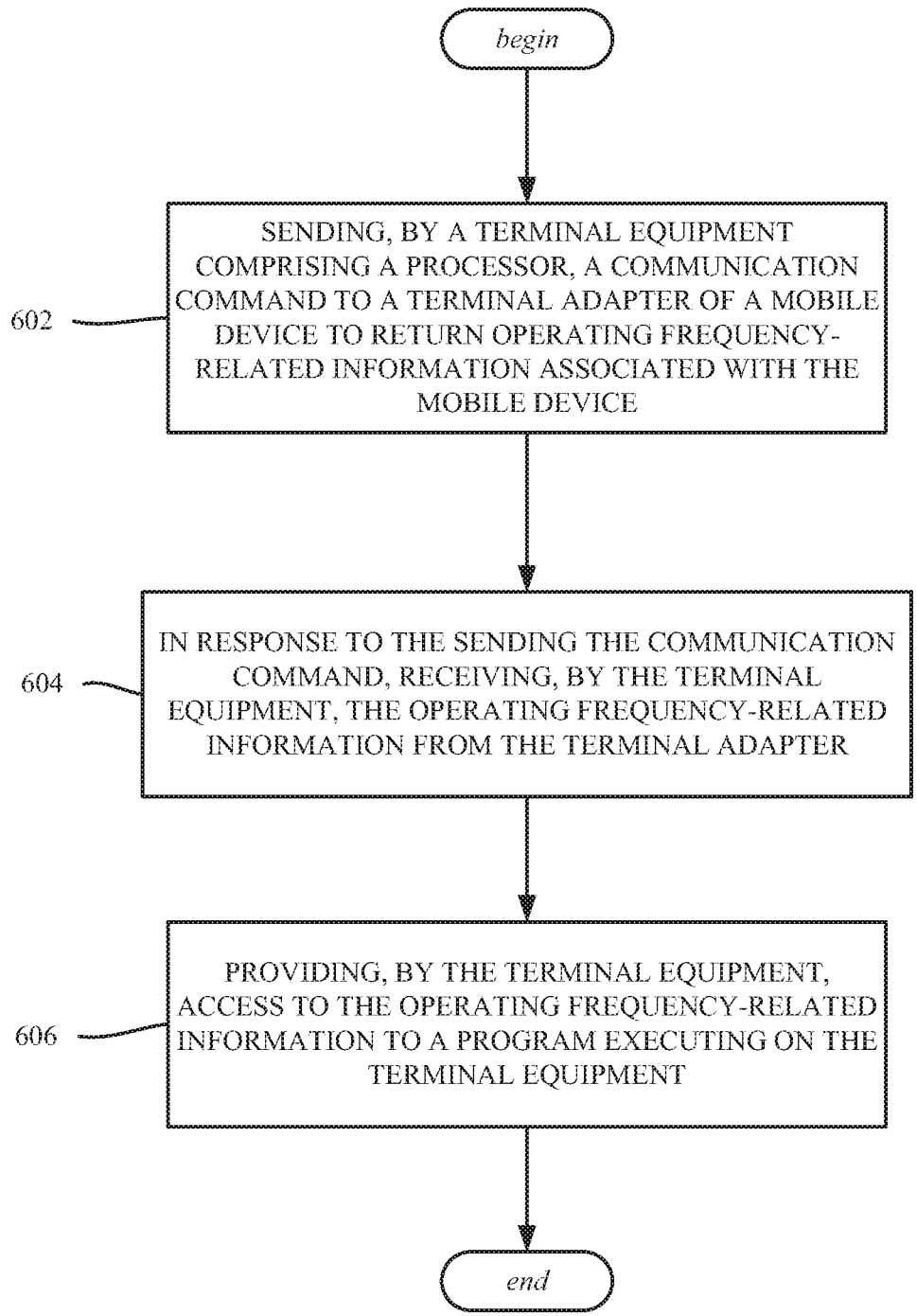
FIG. 6 illustrates a flow diagram directed towards example operations of a terminal equipment with respect to obtaining communication-related operating information from a terminal adapter, in accordance with various aspects and implementations of the subject disclosure.

One or more aspects, such as those implemented in example operations of a method, are shown in FIG. 6 in accordance with various aspects and embodiments of the subject disclosure. Operation 602 represents sending, by a terminal equipment comprising a processor, a communication command to a terminal adapter of a mobile device to return operating frequency-related information associated with the mobile device. Operation 604 represents, in response to the sending the communication command, receiving, by the terminal equipment, the operating frequency-related information from the terminal adapter. Operation 606 represents providing, by the terminal equipment, access to the operating frequency-related information to a program executing on the terminal equipment.

Sending the communication command can comprise sending a command for at least one of: long term evolution component carrier data or new radio component carrier data. Sending the communication command can comprise sending a command for at least one of: long term evolution operating frequency band data or new radio operating frequency band data.

Sending the communication command can comprise sending a command for at least one of: long term evolution component carrier data, long term evolution operating frequency band data, long term evolution multiple input, multiple output data, long term evolution modulation data, new radio component carrier data, new radio operating frequency band data, new radio multiple input, multiple output data, or new radio modulation data.

Sending the communication command can comprise sending a command for at least one of: long term evolution component carrier data, long term evolution operating frequency band data, long term evolution multiple input, multiple output data, long term evolution modulation data, licensed assisted access component carrier data, licensed assisted access operating frequency band data, licensed assisted access multiple input, multiple output data, or licensed assisted access modulation data.

Sending the communication command can comprise issuing an operating frequency-related read command corresponding to an attention command interface.

The communication command can be a read communication command; aspects can comprise sending, by the terminal equipment, a test communication command to the terminal adapter to return supported mobile device operating frequency information, and in response to the sending the test communication command, receiving, by the terminal equipment, the supported mobile device operating frequency information from the terminal adapter.

The communication command can be a first communication command; aspects can comprise sending, by the terminal equipment, a second communication command to the terminal adapter to return downlink user plane information of the mobile device and uplink user plane information of the mobile device, in response to the sending the second communication command, receiving, by the terminal equipment, the downlink user plane information and the uplink user plane information, and providing, by the terminal equipment, access to the downlink user plane information and the uplink user plane information to the program executing on the terminal equipment.

Sending the second communication command can comprise issuing a user plane-related read command corresponding to an attention command interface.

The second communication command can be a read communication command; aspects can comprise, sending, by the terminal equipment, a test communication command to the terminal adapter to return supported user plane information, and in response to the sending the test communication command, receiving, by the terminal equipment, supported mobile device user plane information from the terminal adapter.

The communication command can be a first communication command; aspects can comprise sending, by the terminal equipment, a second communication command to the terminal adapter to return licensed assisted access information of the mobile device, in response to the sending the second communication command, receiving, by the terminal equipment, the licensed assisted access information, and providing, by the terminal equipment, access to the licensed assisted access information to the program executing on the terminal equipment.

Aspects can comprise sending, by the program executing on the terminal equipment, data corresponding to the operating frequency-related information to a test device.

Figure 7:
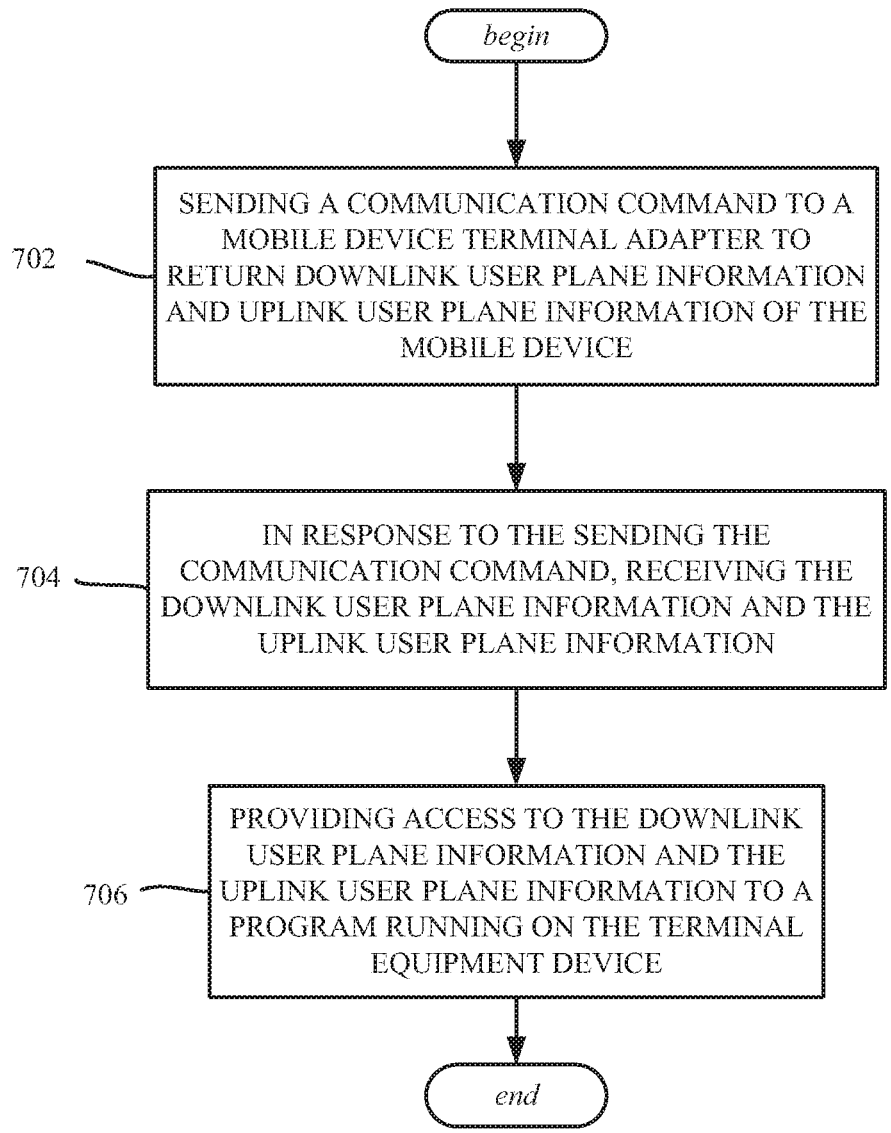
FIG. 7 illustrates a flow diagram directed towards example operations of a terminal equipment with respect to obtaining active user place operating information from a terminal adapter, in accordance with various aspects and implementations of the subject disclosure.

One or more example aspects are represented in FIG. 7, and can correspond to a terminal equipment device comprising a processor and a memory that stores executable instructions that, when executed by the processor, facilitate performance of operations and/or components. Example operations comprise operation 702, which represents sending a communication command to a mobile device terminal adapter to return downlink user plane information and uplink user plane information of the mobile device. Operation 704 represents, in response to the sending the communication command, receiving the downlink user plane information and the uplink user plane information. Operation 706 represents providing access to the downlink user plane information and the uplink user plane information to a program running on the terminal equipment device.

Receiving the downlink user plane information and the uplink user plane information can comprise receiving at least one of: long term evolution downlink user plane information and long term evolution uplink user plane information, or new radio downlink user plane information and new radio uplink user plane information.

The communication command can be a read communication command, and further operations can comprise, sending a test communication command to the mobile device terminal adapter to return information corresponding to supported downlink user plane information and supported uplink user plane information, and in response to the sending the test communication command, receiving the information corresponding to the supported downlink user plane information and the supported uplink user plane information from the mobile device terminal adapter.

The communication command can be a first communication command, and further operations can comprise sending a second communication command to the mobile device terminal adapter to return mobile device operating frequency information, in response to the sending the second communication command, receiving the mobile device operating frequency information, and providing access to the mobile device operating frequency information to the program running on the terminal equipment device.

Sending the second communication command can comprise sending a command for at least one of: long term evolution component carrier data, long term evolution operating frequency band data, long term evolution multiple input, multiple output data, long term evolution modulation data, new radio component carrier data, new radio operating frequency band data, new radio multiple input, multiple output data, or new radio modulation data.

Figure 8:
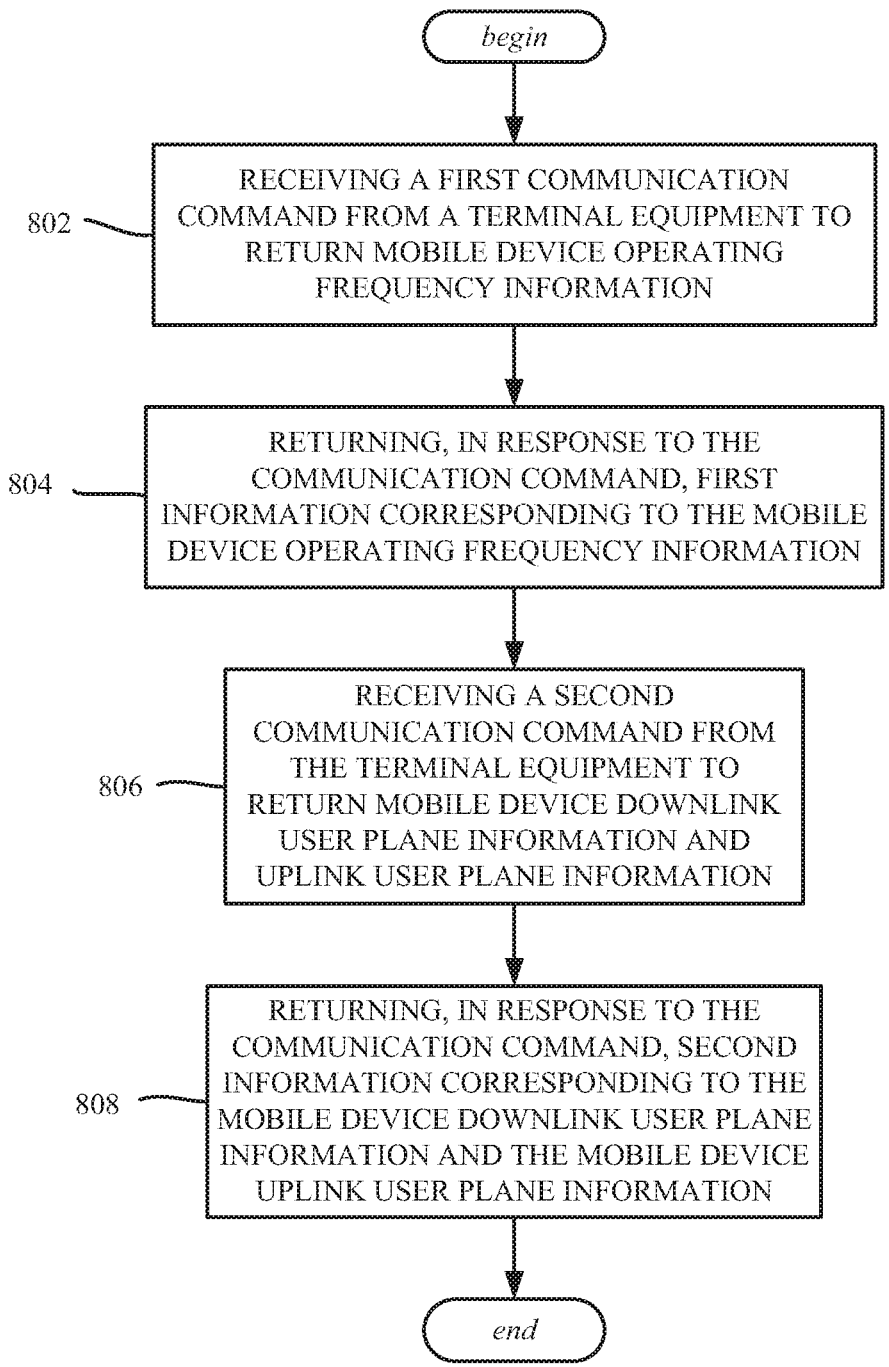
FIG. 8 illustrates a flow diagram directed towards example operations of a terminal adapter with respect to sending frequency-related operating information and active user plane information to a terminal equipment, in accordance with various aspects and implementations of the subject disclosure.

One or more example aspects are represented in FIG. 8, and can correspond to a mobile device comprising a processor and a memory that stores executable instructions that, when executed by the processor, facilitate performance of operations and/or components. Example operations comprise operation 802, which represents receiving a first communication command from a terminal equipment to return mobile device operating frequency information. Operation 804 represents returning, in response to the communication command, first information corresponding to the mobile device operating frequency information. Operation 806 represents receiving a second communication command from the terminal equipment to return mobile device downlink user plane information and uplink user plane information. Operation 808 represents returning, in response to the communication command, second information corresponding to the mobile device downlink user plane information and the mobile device uplink user plane information.

Returning the first information corresponding to the mobile device operating frequency can comprise returning at least one of: long term evolution component carrier data, long term evolution operating frequency band data, new radio component carrier data, new radio operating frequency band data, and wherein the returning the second information comprises returning at least one of: long term evolution mobile device downlink user plane information and long term evolution uplink user plane information, or new radio mobile device downlink user plane information and new radio uplink user plane information.

Returning the first information corresponding to the mobile device operating frequency can comprise returning at least one of: term evolution multiple input, multiple output data, long term evolution modulation data, new radio multiple input, multiple output data, or new radio modulation data, and wherein the returning the second information comprises returning at least one of: long term evolution mobile device downlink user plane information and long term evolution uplink user plane information, or new radio mobile device downlink user plane information and new radio uplink user plane information.

As can be seen, the technology described herein provides a way to obtain operating frequency-related information, including EN-DC operating bands and total carriers in LTE/NR, as well as information on modulations and MIMO layers. The technology can also obtain information on active user plane (downlink and uplink) links while a mobile device is in the EN-DC mode. Further, when in an LTE-LAA mode, operating frequency-related information can also be obtained. Note that the above command sets, e.g., AT command sets, can be extended to include support for standalone 5G/new radio, and also extended to include support for NR-EUTRA Dual Connectivity (NEDC).

In this way, testers and the like can know in a straightforward way the active operating bands, which user plane links a mobile device/user equipment is using, how many carriers in each link the mobile device is using, and so forth. The technology described herein thus provides a more efficient solution for testers to perform lab or field testing.

Figure 9:
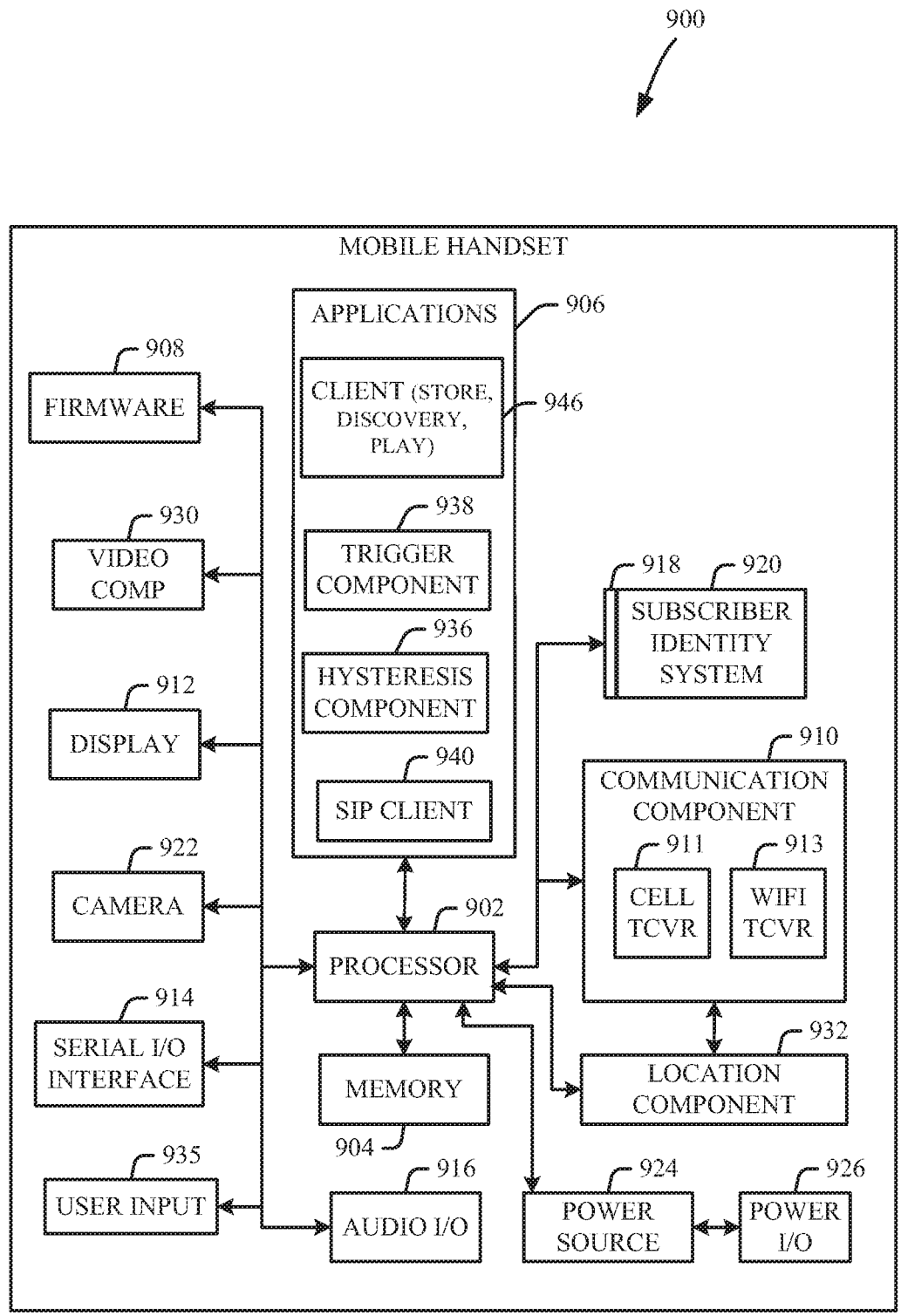
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
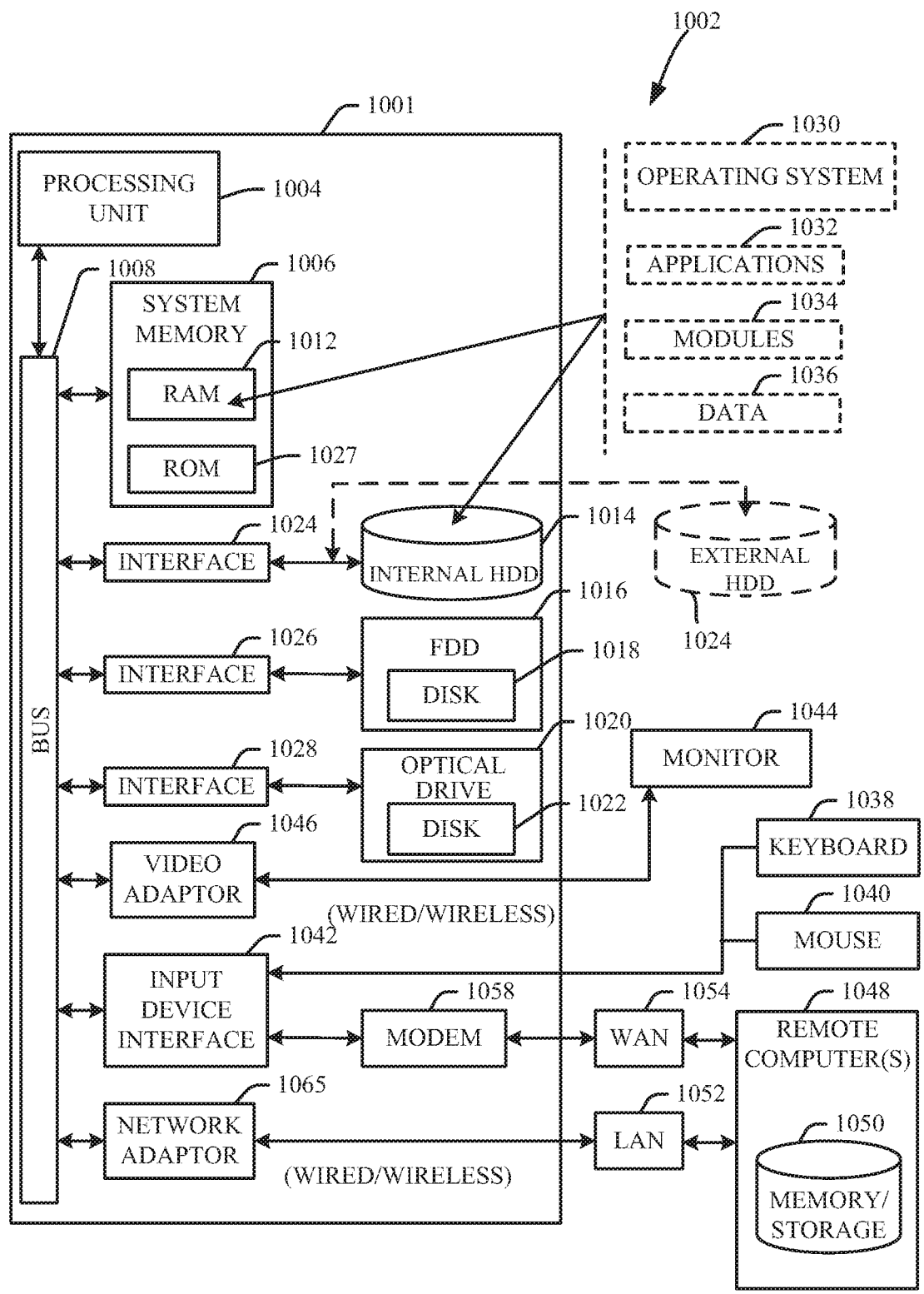
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 10 is but one example of a computing device.

Referring now to FIG. 13, there is illustrated a block diagram of a computer 1300 operable to execute the functions and operations performed in the described example embodiments. For example, a network node (e.g., network node/device 104, GNB, etc.) may contain components as described in FIG. 13. The computer 1300 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1094 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1094 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/ storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A user equipment, comprising:
   a terminal equipment;
   a terminal adapter;
   a processor; and
   a memory that stores executable instructions that, when executed by the processor, facilitate performance of operations, the operations comprising:
   sending a communication command from the terminal equipment to the terminal adapter to return downlink user plane information and uplink user plane information of the user equipment, wherein the communication command is based on an attention command protocol;
   in response to the sending of the communication command, receiving, by the terminal equipment from the terminal adapter, the downlink user plane information and the uplink user plane information, wherein the downlink user plane information comprises respective first current values being employed for first parameters associated with current employment of long term evolution carriers and new radio carriers for first active user plane links for downlink, and the uplink user plane information comprises respective second current values being employed for second parameters associated with current employment of the long term evolution carriers and the new radio carriers for second active user plane links for uplink, wherein the first current values identify frequency bands on which the user equipment is currently operating the downlink; and providing access to the downlink user plane information and the uplink user plane information to a user program running on the user equipment for display in a display of the user equipment.

2. The user equipment of claim 1, wherein the receiving of the downlink user plane information and the uplink user plane information comprises receiving at least one of: long term evolution downlink user plane information and long term evolution uplink user plane information, or new radio downlink user plane information and new radio uplink user plane information.

3. The user equipment of claim 1, wherein the communication command is a read communication command, and wherein the operations further comprise, sending a test communication command to the terminal adapter to return information corresponding to supported downlink user plane information and supported uplink user plane information, and in response to the sending of the test communication command, receiving the information corresponding to the supported downlink user plane information and the supported uplink user plane information from the terminal adapter.

4. The user equipment of claim 1, wherein the communication command is a first communication command, and wherein the operations further comprise, sending a second communication command to the terminal adapter to return operating frequency information, in response to the sending of the second communication command, receiving the operating frequency information, and providing access to the operating frequency information to the user program running on the user equipment.

5. The user equipment of claim 4, wherein the sending of the second communication command comprises sending a command for at least one of: long term evolution component carrier data, long term evolution operating frequency band data, long term evolution multiple input, multiple output data, long term evolution modulation data, new radio component carrier data, new radio operating frequency band data, new radio multiple input, multiple output data, or new radio modulation data.

6. The user equipment of claim 1, wherein the operations further comprise sending, by the user program running on the user equipment, data corresponding to the downlink user plane information and the uplink user plane information to a test device.

7. The user equipment of claim 4, wherein the operations further comprise sending, by the user program running on the user equipment, data corresponding to the operating frequency information to a test device.

8. A method, comprising:
sending, by a terminal equipment of a user equipment comprising a processor, a communication command to a terminal adapter of the user equipment to return downlink user plane information and uplink user plane information of the user equipment, wherein the communication command is based on an attention command protocol;

in response to sending the communication command, receiving, by the terminal equipment from the terminal adapter, the downlink user plane information and the uplink user plane information, wherein the downlink user plane information comprises respective first current values being employed for first parameters associated with current employment of long term evolution carriers and new radio carriers for first active user plane links for downlink, and the uplink user plane information comprises respective second current values being employed for second parameters associated with current employment of the long term evolution carriers and the new radio carriers for second active user plane links for uplink, wherein the first current values identify frequency bands on which the user equipment is currently operating the downlink; and providing, by the terminal equipment, access to the downlink user plane information and the uplink user plane information to a user application executing on the user equipment for presentation in a display of the user equipment.

9. The method of claim 8, wherein the receiving of the downlink user plane information and the uplink user plane information comprises receiving at least one of: long term evolution downlink user plane information and long term evolution uplink user plane information, or new radio downlink user plane information and new radio uplink user plane information.

10. The method of claim 8, wherein the communication command is a read communication command, and further comprising sending a test communication command to the terminal adapter to return information corresponding to supported downlink user plane information and supported uplink user plane information, and in response to the sending of the test communication command, receiving the information corresponding to the supported downlink user plane information and the supported uplink user plane information from the terminal adapter.

11. The method of claim 8, wherein the communication command is a first communication command, and further comprising sending a second communication command to the terminal adapter to return operating frequency information, in response to the sending of the second communication command, receiving the operating frequency information, and providing access to the operating frequency information to the user application executing on the user equipment.

12. The method of claim 11, further comprising, sending, by the user application running on the user equipment, data corresponding to the operating frequency information to a test device.

13. The method of claim 11, wherein the sending of the second communication command comprises sending a command for at least one of: long term evolution component carrier data, long term evolution operating frequency band data, long term evolution multiple input, multiple output data, long term evolution modulation data, new radio component carrier data, new radio operating frequency band data, new radio multiple input, multiple output data, or new radio modulation data.

14. The method of claim 8, further comprising, sending, by the user application running on the user equipment, data corresponding to the downlink user plane information and the uplink user plane information to a test device.

15. A non-transitory machine-readable medium, comprising executable instructions that, when executed by a processor of a user equipment, facilitate performance of operations, comprising:

sending, by a terminal equipment of the user equipment, a communication command to a terminal adapter of the user equipment to return downlink user plane information and uplink user plane information of the user equipment, wherein the communication command is based on an attention command protocol;

in response to sending the communication command, receiving, by the terminal equipment from the terminal adapter, the downlink user plane information and the uplink user plane information, wherein the downlink user plane information comprises respective first current values being employed for first parameters associated with current employment of long term evolution carriers and new radio carriers for first active user plane links for downlink, and the uplink user plane information comprises respective second current values being employed for second parameters associated with current employment of the long term evolution carriers and the new radio carriers for second active user plane links for uplink, wherein the first current values identify frequency bands on which the user equipment is currently operating the downlink; and providing, by the terminal equipment, access to the downlink user plane information and the uplink user plane information to an application executing on the user equipment for presentation in a user interface of the user equipment.

16. The non-transitory machine-readable medium of claim 15, wherein the receiving of the downlink user plane information and the uplink user plane information comprises receiving at least one of: long term evolution downlink user plane information and long term evolution uplink user plane information, or new radio downlink user plane information and new radio uplink user plane information.

17. The non-transitory machine-readable medium of claim 15, wherein the communication command is a read communication command, and wherein the operations further comprise, sending a test communication command to the terminal adapter to return information corresponding to supported downlink user plane information and supported uplink user plane information, and in response to the sending of the test communication command, receiving the information corresponding to the supported downlink user plane information and the supported uplink user plane information from the terminal adapter.

18. The non-transitory machine-readable medium of claim 15, wherein the communication command is a first communication command, and wherein the operations further comprise, sending a second communication command to the terminal adapter to return operating frequency information, in response to the sending of the second communication command, receiving the operating frequency information, and providing access to the operating frequency information to the application executing on the user equipment.

19. The non-transitory machine-readable medium of claim 18, wherein the sending of the second communication command comprises sending a command for at least one of: long term evolution component carrier data, long term evolution operating frequency band data, long term evolution multiple input, multiple output data, long term evolution modulation data, new radio component carrier data, new radio operating frequency band data, new radio multiple input, multiple output data, or new radio modulation data.

20. The non-transitory machine-readable medium of claim 15, wherein the operations further comprise sending, by the application executing on the user equipment, data corresponding to the downlink user plane information and the uplink user plane information to a test device.

* * * * *